(12) United States Patent
Anderson et al.

(10) Patent No.: US 8,438,934 B2
(45) Date of Patent: *May 14, 2013

(54) WRIGGLER FOR GAS METER ENDPOINT

(75) Inventors: Tyson Anderson, Waseca, MN (US); Shawn Showcatally, Makato, MN (US); Robert Payne, Waseca, MN (US)

(73) Assignee: Itron, Inc., Liberty Lake, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/405,493

(22) Filed: Feb. 27, 2012

(65) Prior Publication Data

US 2012/0152031 A1    Jun. 21, 2012

Related U.S. Application Data

(63) Continuation of application No. 12/764,371, filed on Apr. 21, 2010, now Pat. No. 8,122,775.

(51) Int. Cl.
*G01F 1/58* (2006.01)
(52) U.S. Cl.
USPC ............................................. 73/861.12

(58) Field of Classification Search ............... 73/861.02, 73/861.12, 861.79
See application file for complete search history.

(56) References Cited

U.S. PATENT DOCUMENTS

| 4,498,346 | A  | * | 2/1985 | Schneider, Jr. | 73/861.01 |
| 5,291,790 | A  | * | 3/1994 | Atkinson | 73/861.01 |
| 8,122,775 | B2 | * | 2/2012 | Anderson et al. | 73/861.12 |
| 2009/0078523 | A1 | * | 3/2009 | Grzeslo et al. | 192/45 |

* cited by examiner

*Primary Examiner* — Jewel V Thompson
(74) *Attorney, Agent, or Firm* — Dority & Manning, P.A.

(57) ABSTRACT

A wriggler device is provided for a gas meter endpoint or gas meter index as an interface with a gas meter drive mechanism. In general, the wriggler may include a base surface, at least one interface wall, and at least one guide wall. The base surface has a peripheral edge and a center point. The interface wall extends at an interface angle from the base surface, and may have an interface surface and a tip portion, with the tip portion spaced from the base surface. The at least one guide wall may extend between the base surface and the tip portion, and may have a guide surface. The guide wall may be configured to guide the drive mechanism along the guide surface to the base surface. Engagement of the interface surface by the drive mechanism causes the wriggler to rotate.

21 Claims, 5 Drawing Sheets

WRIGGLER FOR GAS METER ENDPOINT

This application is a continuation of prior U.S. patent application Ser. No. 12/764,371 filed Apr. 21, 2010, now U.S. Pat. No. 8,122,775 issued Feb. 28, 2012 entitled "WRIGGLER FOR GAS METER ENDPOINT", which is hereby incorporated herein by reference in its entirety for all purposes. Any disclaimer that may have occurred during prosecution of the above-referenced application is hereby expressly rescinded.

FIELD OF THE INVENTION

Background of the Invention

Gas meters are widely utilized in the metering and energy arts to measure the amount of gas flowing through gas lines. To allow such flow data to be collected and interpreted, gas meter modules, known in the art as gas meter endpoints or gas meter indexes and collectively referred to herein as gas meter endpoints, may be connected to the gas meters. Further, technology related to gas meter endpoints has advanced generally to the use of automatic meter reading (AMR) systems, which allow for the transmission of gas consumption data to locations remote from the gas meters and gas meter endpoints.

To allow gas meter endpoints to collect or display consumption data, an interface for the gas meter endpoints with the gas meters must be provided. A typical gas meter includes a drive mechanism which rotates about an axis as gas flows through the gas meter and is consumed. Thus, a gas meter endpoint generally engages the rotating gas meter drive mechanism and collects gas consumption data based on the rotation of the drive mechanism. For example, many gas meter endpoints include a wriggler. The wriggler is generally configured to provide for the gas meter endpoint an interface with the drive mechanism of the gas meter. As the drive mechanism rotates, it causes the wriggler to rotate, and the rotation of the wriggler is utilized to collect gas consumption data.

The installation of gas meter endpoints on gas meters, in many cases, requires a blind assembly procedure. For example, the installer of the gas meter endpoint may not be able to visually orient and connect the wriggler of the gas meter endpoint to the drive mechanism, because the wriggler and drive mechanism may be shielded from the view of the installer during installation. Thus, in many cases, the wriggler is improperly or poorly mounted to, or engaged with, an associated drive mechanism. For example, if the wriggler is not correctly mounted to the drive mechanism, components of the drive mechanism may become improperly embedded in the wriggler, subjecting the drive mechanism to excessive drag and unintentional loads. Such an installation can change the normal or expected rotation of the drive mechanism to an inhibited or unexpected rotation, causing improper readings and potentially severely damaging the gas meter and drive mechanism, even possibly to the point of failure.

Further, after a gas meter endpoint is installed on a gas meter, the installer must wait a finite amount of time for the drive mechanism to engage the wriggler and provide initial flow data, to ensure that the gas meter endpoint is working and to confirm a proper installation. In many cases, the wriggler includes substantial so-called "take-up" portions, which are portions of the wriggler that do not rotatably engage the drive mechanism. The drive mechanism must rotate through such take-up portions before engaging the wriggler and providing initial flow data. Such "take-up time" can, in some cases, last 15 to 20 minutes or longer.

Thus, a wriggler device that facilitates proper installation of a gas meter endpoint on a gas meter and reduces the risk of improper installation would be desired in the art. Additionally, a wriggler device that reduces take-up time after installation would be advantageous.

SUMMARY OF THE INVENTION

Aspects and advantages of the present subject matter will be set forth in part in the following description, or may be apparent from the description, or may be learned through practice of the present subject matter.

The present disclosure recognizes and addresses the above-noted drawbacks and disadvantages of typical prior art wrigglers.

It is a general object of the present disclosure to provide an improved wriggler. It is a more specific object of the present disclosure to provide a wriggler that facilitates proper installation of gas meter endpoints or gas meter indexes (collectively also referred to herein as gas meter endpoints) on gas meters and reduces the risk of improper installation. It is a further specific object of the present disclosure to provide a wriggler that reduces take-up time after installation of the gas meter endpoint on an associated gas meter.

Thus, the present disclosure is directed to wriggler devices. An exemplary wriggler may be utilized, as part of an associated gas meter endpoint, to provide an interface with an associated drive mechanism.

In one present exemplary embodiment, a present exemplary wriggler may include a base surface, at least one interface wall, and at least one guide wall. The base surface may have a peripheral edge and a center point. The at least one interface wall may extend at an interface angle from the base surface, and may have an interface surface and a tip portion, the tip portion spaced from the base surface. The at least one guide wall may extend between the base surface and the tip portion, and may have a guide surface. The guide wall may be configured to guide the drive mechanism along the guide surface to the base surface. Engagement of the interface surface by the drive mechanism may cause the wriggler to rotate.

In some instances and embodiments, the interface angle of the present wriggler may be in a range from approximately 90 degrees to approximately 120 degrees, and may be approximately 90 degrees in some exemplary embodiments.

In various embodiments, the interface surface may extend radially between the center point and the peripheral edge, and the guide wall may extend circumferentially between the base surface and the tip portion.

In further embodiments, the wriggler of the present disclosure may include a plurality of interface walls and a plurality of guide walls. Each of the guide walls may extend between the base surface and the tip portion of one of the interface walls. For example, the wriggler in various embodiments may include two, three, four, or more interface walls and guide walls.

The wriggler may in some instances and embodiments be provided with features such as a plurality of take-up portions of the base surface, each of the take-up portions extending circumferentially between one of the guide walls and the interface surface of one of the interface walls.

Additional objects and advantages of the present subject matter are set forth in, or will be apparent to, those of ordinary skill in the art from the detailed description herein. Also, it should be further appreciated that modifications and variations to the specifically illustrated, referred and discussed features, elements, and steps hereof may be practiced in various embodiments and uses of the present subject matter without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the present subject matter may include various combinations or configurations of presently disclosed features, steps, or elements, or their equivalents including combinations of features, parts, or steps or configurations thereof not expressly shown in the figures or stated in the detailed description of such figures. Additional embodiments of the present subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification. The accompanying drawings, which are incorporated in and constitute a part of this specification, illustrate embodiments of the present subject matter and, together with the description, serve to explain the principles of the present subject matter.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which.

DETAILED DESCRIPTION OF THE PREFERRED EMBODIMENTS

Reference now will be made in detail to exemplary embodiments of the present subject matter, one or more examples of which are illustrated in the drawings. Each example is provided by way of explanation of the present subject matter, not limitation of the present subject matter. In fact, it will be apparent to those skilled in the art that various modifications and variations can be made in the present subject matter without departing from the scope or spirit of the present subject matter. For instance, features illustrated or described as part of one embodiment can be used with another embodiment to yield a still further embodiment. Thus, it is intended that the present subject matter covers such modifications and variations as come within the scope of the disclosure and equivalents thereof.

Figure 1:
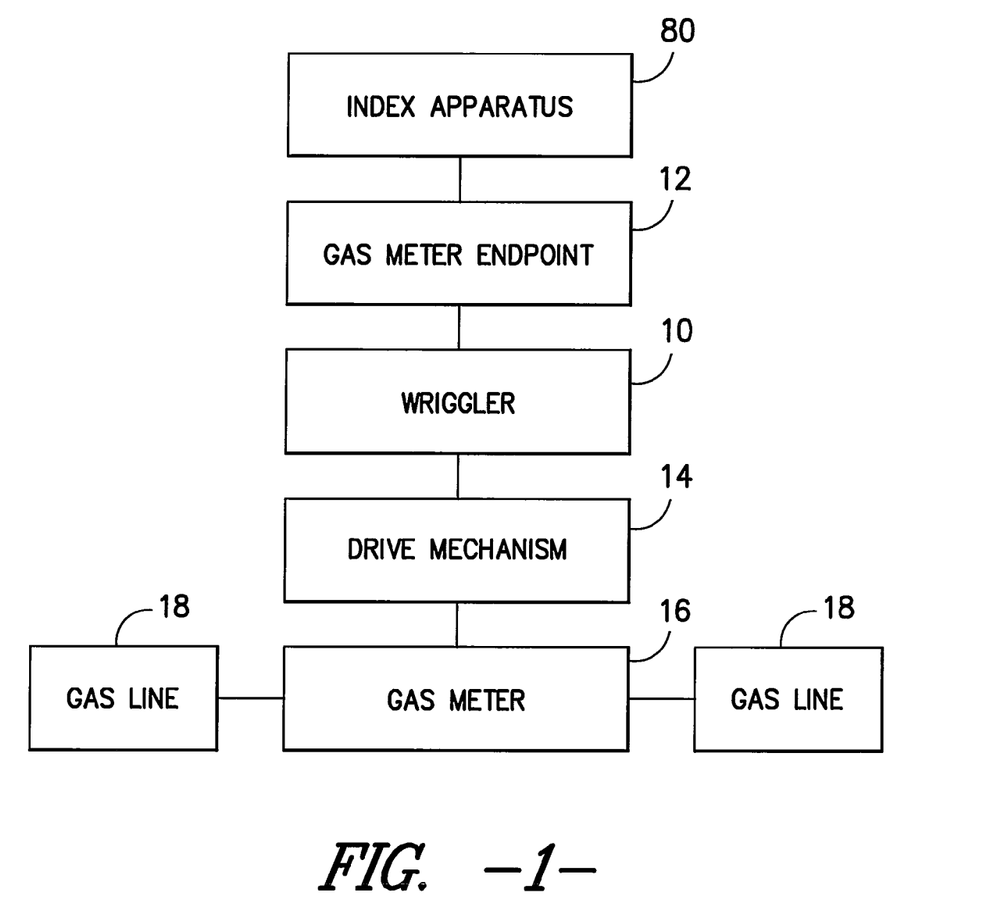
FIG. 1 is a block diagram or schematic representation of one present exemplary embodiment of an interface for a gas meter endpoint with a gas meter on a gas line in accordance with the present disclosure.
Figure 2:
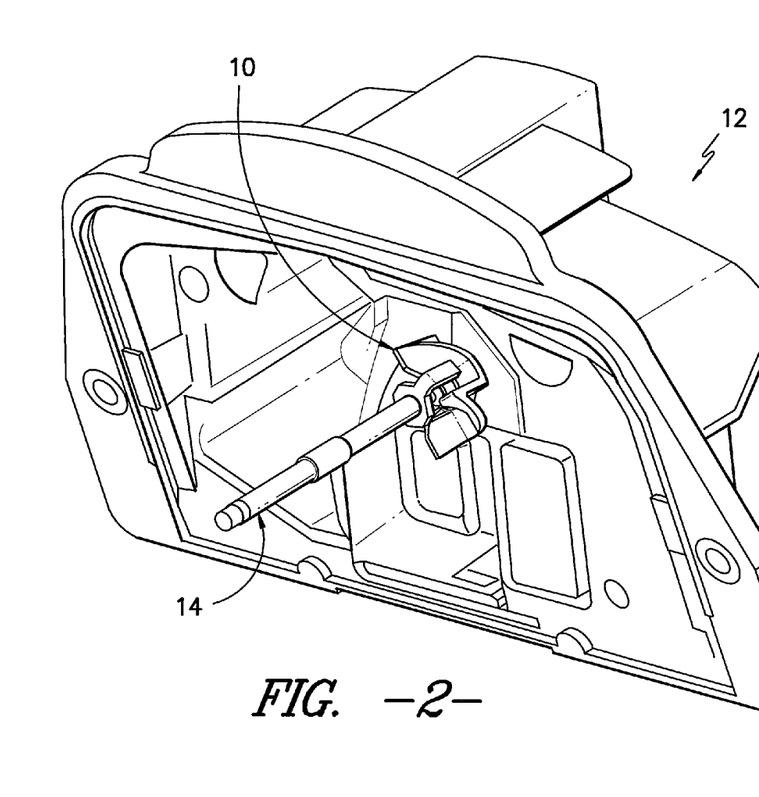
FIG. 2 is a perspective view of one present exemplary embodiment of a gas meter endpoint and a drive mechanism in accordance with the present disclosure.

FIGS. 1 through 6 represent and/or illustrate exemplary embodiments of a wriggler 10 of the present disclosure. As shown in FIGS. 1 and 2, for example, the wriggler 10 generally provides an interface for, and as part of, a gas meter endpoint or gas meter index 12, collectively referred to herein as gas meter endpoints 12, with a drive mechanism 14 of a gas meter 16, which may be installed in a gas line 18. The gas meter 16 may generally provide gas consumption data as gas flows through the gas line 18. Drive mechanism 14 may generally rotate at a rate based on the amount of gas flowing through the gas line 18. The wriggler 10 may interface with the drive mechanism 14 and may be rotated by the drive mechanism 14. For example, the wriggler 10 may be connected to the gas meter endpoint 12 through a shaft generally 22. The wriggler 10 may be rotatable about the shaft 22. The drive mechanism 14 may engage the wriggler 10, and rotation of the drive mechanism 14 may cause the wriggler 10 to rotate about the shaft 22.

An index apparatus generally 80 in communication with the gas meter endpoint 12 may monitor the rotation of the wriggler 10.

Figure 3:
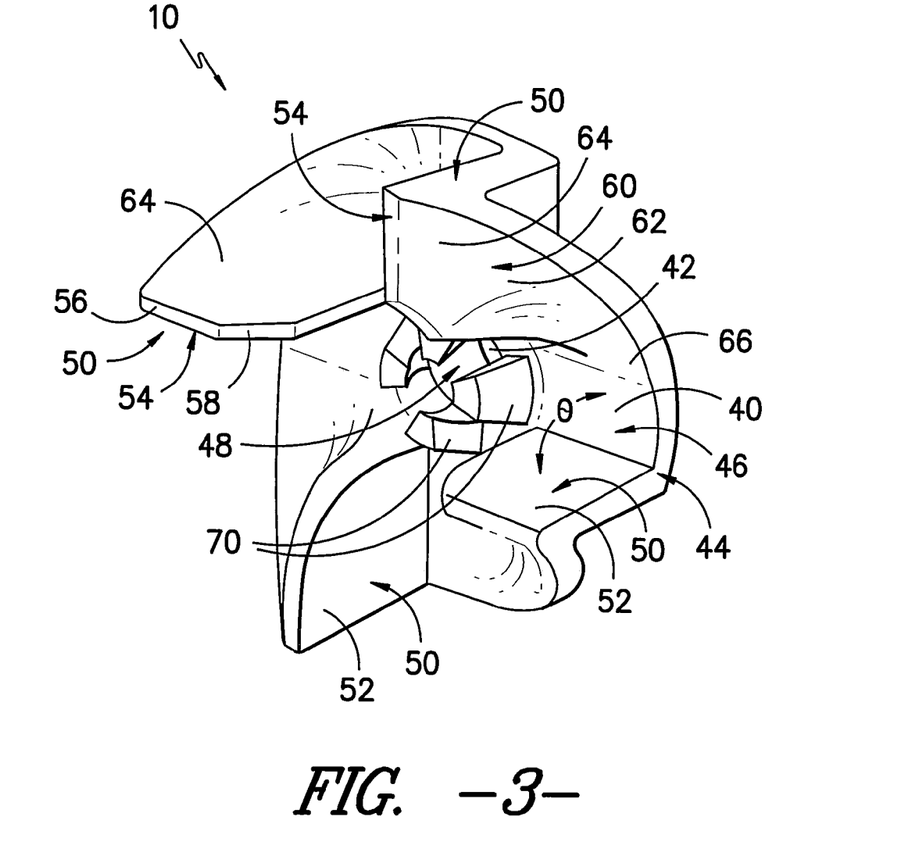
FIG. 3 is a perspective view of one present exemplary embodiment of a wriggler in accordance with the present disclosure.

As shown in FIG. 3, the wriggler 10 may include a base surface 40, at least one interface wall 50, and at least one guide wall 60. In an exemplary embodiment, the base surface 40 may define a circumference, and the wriggler 10 may be generally circular- or oval-shaped. Alternatively, the base surface 40 may define a perimeter, and the wriggler 10 may be generally rectangular-, triangular-, or polygonal-shaped. Further, the base surface 40 may generally define a center point 42 and peripheral edge 44.

The at least one interface wall 50 may extend at an interface angle θ from the base surface 40. Interface angle θ may be an angle in the range from approximately 0 degrees to approximately 180 degrees, such as in the range from approximately 90 degrees to approximately 180 degrees, such as in the range from approximately 90 degrees to approximately 120 degrees. Further, in an exemplary embodiment, interface angle may be approximately 90 degrees.

The interface wall 50 may include, for example, an interface surface 52 and a tip portion 54. The tip portion 54 may be spaced from the base surface 40. In an exemplary embodiment, the tip portion 54 may be the portion of the interface wall 50 that is generally furthest from the base surface 40. For example, the tip portion 54 may include tip surface 56 of the interface wall 50, and may further include notch surface 58 of the interface wall 50. In exemplary embodiments, tip surface 56 may be generally parallel to the base surface 40. However, it should be understood that tip surface 56 is not limited to being generally parallel to the base surface 40, and may be at an angle to the base surface 40. Notch surface 58 may be that portion of tip portion 54 that is generally proximate the center point 42. In exemplary embodiments, the notch surface 58 may be at an angle to the tip surface 56, and may extend generally downward from the tip surface 56 towards the base surface 40. However, it should be understood that the notch surface 58 is not limited to such orientation, and may rather be generally parallel to or extend generally upward from the tip surface 56.

In exemplary embodiments, the interface wall 50, and thus the interface surface 52, may extend generally radially between center point 42 and peripheral edge 44. For example, the interface wall 50 may be radially aligned with the center point 42 and may extend generally radially towards peripheral edge 44. Alternatively, however, the interface wall 50 may be slightly offset from the center point 42 and may extend generally radially towards peripheral edge 44.

The at least one guide wall 60 may extend between the base surface 40 and the tip portion 54 of the interface wall 50, and may include guide surface 62. End portion 64 of the guide surface 62 may adjoin the tip portion 54. For example, end portion 64 or a portion thereof may adjoin the tip surface 56. Further, end portion 64 or a portion thereof may adjoin the notch surface 58. End portion 66 of the guide surface may adjoin the base surface 40.

In exemplary embodiments, the guide wall 60, and thus the guide surface 62, may be generally curvilinear. Further, as shown in FIGS. 2 through 6, the guide wall 60 and guide surface 62 may extend generally circumferentially or peripherally between the base surface 40 and the tip portion 54. For example, the guide wall 60 and guide surface 62 may extend generally about the circumference or perimeter defined by the base surface 40. Further, the guide wall 60 and guide surface 62 may be bounded by the circumference or perimeter defined by the base surface 40, or may extend past or not reach the circumference or perimeter defined by the base surface 40. It should be understood, however, that the guide wall 60 is not limited to curvilinear and circumferential or peripheral orientations. For example, in alternative embodiments, the guide wall 60 and guide surface 62 may be generally linear. Further, the guide wall 60 may extend axially between the base surface 40 and the tip portion 54.

In exemplary embodiments, the wriggler 10 of the present disclosure may further include a plurality of interface walls 50 and a plurality of guide walls 60. Each of the guide walls 60 may extend between the base surface 40 and the tip portion 54 of one of the interface walls 50. Thus, each of the guide walls 60 may be coupled with an interface wall 50.

For example, in one embodiment, the wriggler 10 may include two interface walls 50 and two guide walls 60. Further, in certain embodiments, the two interface walls 50 may be spaced approximately 180 degrees apart about the center point 42 of the base surface 40. In alternative embodiments, the wriggler 10 may include three interface walls 50 and three guide walls 60. Further, in certain embodiments, the three interface walls 50 may be spaced approximately 120 degrees apart about the center point 42 of the base surface 40. In further alternative embodiments, as shown in FIGS. 2 through 6, the wriggler 10 may include four interface walls 50 and four guide walls 60. Further, in certain embodiments, each of the four interface walls 50 may be spaced approximately 90 degrees apart about the center point 42 of the base surface 40.

In exemplary embodiments, the base surface 40 may further include a plurality of take-up portions 46. Each of such take-up portions 46 may extend circumferentially between one of the guide walls 60 and the interface surface 52 of one of the interface walls 50. Alternatively, however, each of the take-up portions 46 may extend linearly between one of the guide walls 60 and the interface surface 52 of one of the interface walls 50. Thus, for example, the take-up portions 46 may be those portions of the base surface 40 that separate each coupling of a guide wall 60 and an interface wall 50 from other such couplings of guide walls 60 and interface walls 50.

Figures 4, 5:
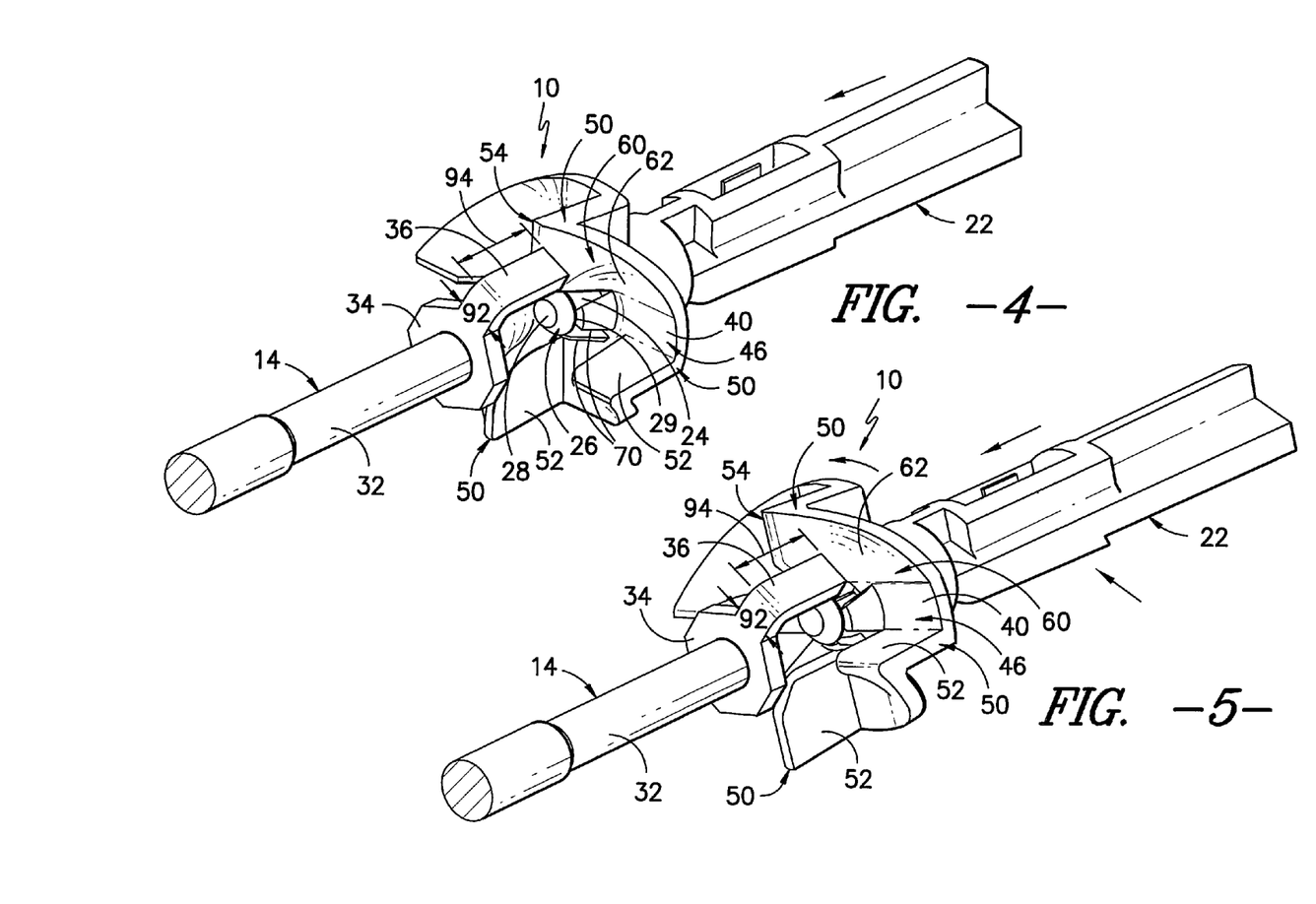
FIG. 4 is a perspective view of one representative configuration of a present exemplary wriggler and a drive mechanism in accordance with the present disclosure as the wriggler contacts such drive mechanism in an improper position during installation.
FIG. 5 is a perspective view of one representative configuration of a present exemplary wriggler and a drive mechanism in accordance with the present disclosure as the wriggler contacts such drive mechanism, as they are guided into a proper position during installation.
Figure 6:
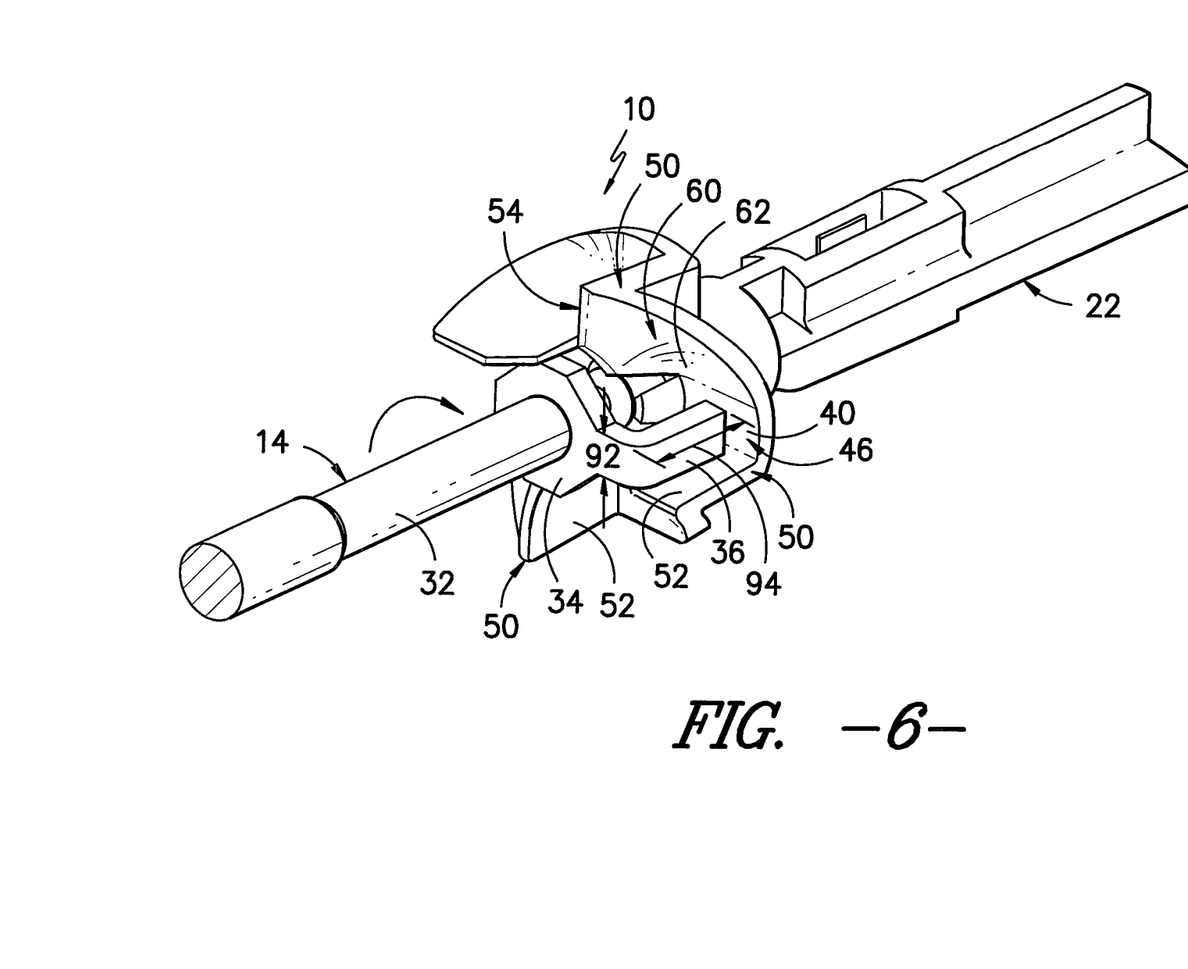
FIG. 6 is a perspective view of one representative configuration of a present exemplary wriggler and a drive mechanism in accordance with the present disclosure in a proper position after installation is complete.

In exemplary embodiments, the base surface 40 may define a central aperture 48. For example, the central aperture 48 may be disposed generally adjacent to or aligned with the center point 42. The central aperture 48 may be configured to provide an interface function relative to wriggler 10 and the gas meter endpoint 12. For example, the central aperture 48 may couple the wriggler 10 to the shaft portion 22 of the gas meter endpoint 12, as shown in FIGS. 4 through 6 and as otherwise discussed herein.

The wriggler 10 may further include a plurality of retaining members 70. The retaining members 70 may extend generally from the base surface 40 and be disposed about the central aperture 48. Further, the retaining members 70 may be formed from a generally resilient material. The retaining members 70 may further couple the wriggler 10 to the gas meter endpoint 12, such as to the shaft 22 of the gas meter endpoint 12, as otherwise discussed herein.

The central aperture 48 and the retaining members 70 may couple the wriggler to the shaft 22 of the gas meter endpoint 12. While in some instances referenced as if part of respective separable components, those of ordinary skill in the art will understand from the complete disclosure herewith that the present wriggler subject matter forms part of a gas meter endpoint.

Shaft 22 may include, for example, an interface portion 24 and a shaft head 26. The interface portion 24 may generally have a diameter similar to or less than the diameter of the central aperture 48, such that the wriggler 10 may be mounted to the shaft 22 by placing the interface portion 24 generally within the central aperture 48. The shaft head 26 may generally have a tapered cross-section, such that a tip portion 28 of the shaft head 26 may have a diameter, and that diameter may increase along the length of the shaft head 26 to a base portion 29 of the shaft head 26. In various embodiments, the diameter of the tip portion 28 may be generally similar to, larger than, or smaller than the diameter of the interface portion 24 of the shaft 22. Further, in various embodiments, the diameter of the base portion 29 of the shaft head 26 may be generally similar to or larger than the diameter of the interface portion 24 of the shaft 22.

As interface portion 24 is placed through central aperture 48, the tapered shaft head 26 may interact with the retaining members 70, causing the retaining members 70 to expand in a radially outward direction to allow the shaft head 26 to pass through the retaining members 70. Once the shaft head 26 has passed through the retaining members 70, the resilient retaining members 70 may revert from their radially expanded position to their original position, thus preventing the shaft head 26, and thus the shaft 22, from being removed from the central aperture 48.

As discussed in detail herein, the wriggler 10 of the present disclosure may, as part of a gas meter endpoint 12, provide an interface with an associated drive mechanism 14 of the present disclosure. The drive mechanism 14 may include, for example, a shaft 32 and a drive dog 34 disposed at the end of the shaft 32. The shaft 32 may rotate as gas flows through the gas line 18. Further, the rotational rate of the shaft 32 may vary with respect to the amount of gas flow through the gas line 18. The rotation of the shaft 32 may cause the drive dog 34 to rotate. The drive dog 34 may include an interface tab 36. In exemplary embodiments, for example, the interface tab 36 may be generally L-shaped, and may extend generally radially and axially from the shaft 32 and the drive dog 34. Alternatively, however, the interface tab 36 may be a generally axially extending tab, or may have any other shape known in the art. As otherwise discussed herein, the interface tab 36 of the drive dog 34 may interact with the wriggler 10 of the gas meter endpoint 12 to provide the interface for such endpoint with the drive mechanism 14.

In exemplary embodiments of the present disclosure, the guide wall 60 may be configured to guide the drive mechanism 14 along the guide surface 62 to the base surface 40. For example, as discussed herein, the guide wall 60 may extend between the base surface 40 and the tip portion 54 of the interface wall 50, and may include guide surface 62. During installation of the gas meter endpoint 12 on a gas meter 16 such that the gas meter endpoint 12 interfaces with the drive mechanism 14, the wriggler 10 of the endpoint 12 may contact the interface tab 36 of the drive dog 34. For a proper installation, as represented by present FIG. 6, the wriggler 10 should contact the drive dog 34 in a position such that the interface tab 36 is generally disposed proximate the base surface 40, such as proximate a take-up portion 46 of the base surface 40, and adjacent the interface wall 50. Thus, during installation, if the wriggler 10 should contact the drive dog 34 in an improper position, as represented with present FIGS. 4 and 5, the interface tab 36 may contact the guide surface 62 of the guide wall 60. Because the guide wall 60 extends between the base surface 20 and the tip portion 54 of the interface wall 50, the guide wall 60 may act to guide the interface tab 36 along the guide surface 62 generally away from the tip portion 54 and towards the base surface 40, as shown in FIG. 5, until, when the gas meter endpoint 12 is properly installed, the interface tab 36 is generally disposed proximate the base surface 40, such as proximate a take-up portion 46 of the base surface 40, and adjacent the interface wall 50. Thus, the wriggler 10 of the present disclosure advantageously allows for improved installation of gas meter endpoints 12 on gas meters 16, and reduces the risks of improper installation of gas meter endpoints 12 and subsequent damage to wrigglers 10 or drive mechanisms 14.

After installation of the gas meter endpoint 12 on gas meter 16, the interface tab 36 of the drive dog 34 may interact with the wriggler 10 to provide for the gas meter endpoint 12 an interface with the drive mechanism 14, as otherwise discussed herein and as shown in FIGS. 2 and 6.

Further, engagement of the interface surface 52 by the drive mechanism 14 may cause the wriggler 10 to rotate, as indicated in FIG. 6. For example, as otherwise discussed herein, the shaft 32 may rotate at varying rates with respect to the amount of gas flow through the gas line 18 and gas meter 16, and the rotation of the shaft 32 may cause the drive dog 34, and thus the interface tab 36, to rotate. As the interface tab 36 rotates, the interface tab 36 may encounter and engage the interface surface 52 of interface wall 50. As the interface tab 36 continues to rotate about the shaft 32, it may subject the interface surface 52 and the interface wall 50 to a rotational force. The rotational force caused by the interface tab 36 may cause the wriggler 10 to rotate about the shaft 22, such that the wriggler 10 has a rotational rate that is substantially similar to the rotational rate of the interface tab 36.

The wriggler 10 of the present disclosure may be sized to interface with any variety of sizes of drive dogs 34. For example, typical drive dogs 34 in gas meters 16 may include interface tabs 36 that have widths 92 in the range from approximately 0.1 inches to approximately 0.12 inches, such as from approximately 0.105 inches to approximately 0.115 inches. Further, it should be understood that the drive dog 34 of the present disclosure is not limited to having an interface tab 36 with a width 92 in the range from approximately 0.1 inches to approximately 0.12 inches, but may be any size drive dog 34 having any size interface tab 36 now or later known in the art.

Further, for example, typical drive dogs 34 in gas meters 16 may include interface tabs 36 that have lengths 94 in the range from approximately 0.2 inches to approximately 0.3 inches. However, it should be understood that the drive dog 34 of the present disclosure is not limited to having an interface tab 36 with a length 94 in the range from approximately 0.2 inches to approximately 0.3 inches, but may be any size drive dog 34 having any size interface tab 36 now or later known in the art.

Further, it should be understood that the full length 94 of the interface tab 36 may engage the interface surface 52, or only a portion of the length 94 of the interface tab 36 may engage the interface surface 52. For example, in certain embodiments, only a portion in the range from approximately 0.040 inches to approximately 0.150 inches of the length 94 of the interface tab 36 may engage the interface surface 52, though in some embodiments other lengths may be practiced.

The wriggler 10 of the present disclosure may be sized to accommodate any size drive dog 34, such that the interface tab 36 of the drive dog 34 can interact with the wriggler 10 to provide the interface for gas meter endpoint 12 with the drive mechanism 14 and the, as otherwise discussed herein. For example, the base surface 40, such as the take-up portions 46, may be sized to accommodate drive dogs 34 that include interface tabs 36 with varying widths, as otherwise discussed herein.

As the wriggler 10 rotates about the shaft 22 due to the engagement of the interface surface 52 by the drive mechanism 14, the rotational rate of the wriggler 10 may be monitored by index apparatus 80. The index apparatus 80 may collect and interpret the rotational speed of the wriggler 10, which is representative of the gas flow rate. Further, such index apparatus may output the amount of gas consumption for the gas flow through the gas line 18. The index apparatus 80 may be in communication with the wriggler 10 mechanically, such as through any interface known in the art, or wirelessly, through any technique known in the art.

This written description uses examples to disclose the present subject matter, including the best mode, and also to enable any person skilled in the art to practice the present subject matter, including making and using any devices or systems and performing any incorporated methods. While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure and associated claims do not preclude inclusion of such modifications, variations and/or additions to the present subject matter as would be readily apparent to one of ordinary skill in the art.

What is claimed is:

1. A wriggler for providing for a gas meter endpoint an interface with a drive mechanism of a gas meter, comprising:
   a base surface having a circumferential edge and a center point;
   a plurality of interface walls each extending at an interface angle from said base surface, having an interface surface, and having a tip portion spaced from said base surface; and
   a plurality of guide walls each having a guide surface and extending between said base surface and said tip portion of one of said interface walls.

2. The wriggler of claim 1, wherein each of said interface surfaces extends generally radially towards said circumferential edge, and wherein said base surface includes a plurality of take-up portions, each of which extends circumferentially between one of said guide walls and said interface surface of one of said interface walls, and wherein said interface angle of each of said interface walls is in a range from approximately 90 degrees to approximately 120 degrees.

3. The wriggler of claim 1, wherein each of said interface surfaces extends radially between said center point and said circumferential edge.

4. The wriggler of claim 1, wherein each of said interface surfaces extends generally radially towards said circumferential edge surface and is offset from said center point.

5. The wriggler of claim 1, wherein each of said guide walls is generally curvilinear.

6. The wriggler of claim 1, wherein each of said guide walls extends circumferentially between said base surface and said tip portion of one of said interface walls.

7. The wriggler of claim 1, wherein:
said wriggler comprises four interface walls and four guide walls; and
wherein said four interface walls are respectively each spaced approximately 90 degrees apart about said center point.

8. The wriggler of claim 1, wherein said base surface includes a plurality of take-up portions, each of which extends circumferentially between one of said guide walls and said interface surface of one of said interface walls.

9. The wriggler of claim 1, wherein said base surface defines a central aperture configured to provide an interface for said wriggler as part of an associated gas meter endpoint.

10. The wriggler of claim 1, wherein said interface angle of each of said interface walls is in a range from approximately 90 degrees to approximately 120 degrees.

11. The wriggler of claim 1, wherein said interface angle of each of said interface walls is approximately 90 degrees.

12. A wriggler for providing for a gas meter endpoint an interface with a drive mechanism of a gas meter, comprising:
a base surface having a circumferential edge and a center point;
at least one interface wall extending at an interface angle from said base surface, having an interface surface extending generally radially towards the circumferential edge, and having a tip portion spaced from said base surface; and
at least one guide wall, having a guide surface, extending between said base surface and said tip portion.

13. The wriggler of claim 12, wherein:
said at least one interface wall comprises a plurality of interface walls; and
said at least one guide wall comprises a plurality of guide walls;
wherein each of said guide walls extends between said base surface and said tip portion of one of said interface walls; and
wherein said base surface includes a plurality of take-up portions, each of which extends circumferentially between one of said guide walls and said interface surface of one of said interface walls; and
wherein said interface surface is offset from said center point; and
wherein said interface angle of each of said interface walls is in a range from approximately 90 degrees to approximately 120 degrees.

14. The wriggler of claim 12, wherein said interface surface is offset from said center point.

15. The wriggler of claim 12, wherein said guide wall extends circumferentially between said base surface and said tip portion.

16. The wriggler of claim 12, wherein:
said at least one interface wall comprises a plurality of interface walls; and
said at least one guide wall comprises a plurality of guide walls;
wherein each of said guide walls extends between said base surface and said tip portion of one of said interface walls.

17. The wriggler of claim 16, wherein:
said wriggler comprises four interface walls and four guide walls; and
wherein said four interface walls are respectively each spaced approximately 90 degrees apart about said center point.

18. The wriggler of claim 16, wherein said base surface includes a plurality of take-up portions, each of which extends circumferentially between one of said guide walls and said interface surface of one of said interface walls.

19. The wriggler of claim 12, wherein said base surface defines a central aperture configured to provide an interface for said wriggler as part of an associated gas meter endpoint.

20. The wriggler of claim 12, wherein said interface angle is in a range from approximately 90 degrees to approximately 120 degrees.

21. The wriggler of claim 12, wherein said interface angle is approximately 90 degrees.

* * * * *